(12) United States Patent
Kalaboukis et al.

(10) Patent No.: US 11,599,890 B1
(45) Date of Patent: Mar. 7, 2023

(54) HOLISTIC FRAUD COCOON

(71) Applicant: Wells Fargo Bank, N.A., San Francisco, CA (US)

(72) Inventors: Chris Kalaboukis, San Jose, CA (US); Andrew J. Garner, IV, State Road, NC (US); Andres J. Saenz, Redmond, WA (US); Abhijit Rao, Irvine, CA (US); Ramanathan Ramanathan, Bellevue, WA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 1040 days.

(21) Appl. No.: 15/388,017

(22) Filed: Dec. 22, 2016

(51) Int. Cl.
*G06Q 30/00* (2012.01)
*H04W 12/12* (2021.01)
*H04L 9/40* (2022.01)
*H04M 1/663* (2006.01)
*H04M 3/54* (2006.01)
*H04M 3/22* (2006.01)
*G06Q 30/018* (2023.01)

(52) U.S. Cl.
CPC ..... *G06Q 30/0185* (2013.01); *H04L 63/1483* (2013.01); *H04M 1/663* (2013.01); *H04M 3/2281* (2013.01); *H04M 3/543* (2013.01); *H04W 12/12* (2013.01)

(58) Field of Classification Search
CPC .............. G06Q 30/0185; H04M 3/543; H04M 3/2281; H04M 1/663; H04W 12/12; H04L 63/1483
See application file for complete search history.

(56) References Cited

U.S. PATENT DOCUMENTS

| 6,970,830 B1* | 11/2005 | Samra ................ G06Q 30/02 705/7.33 |
| 7,984,500 B1* | 7/2011 | Khanna ............... G06F 21/552 709/225 |
| 2003/0033302 A1* | 2/2003 | Banerjee .............. G06Q 10/00 |
| 2003/0210047 A1* | 11/2003 | Mitchell ........... G06K 9/00503 324/309 |
| 2004/0215599 A1* | 10/2004 | Apps ..................... G06N 5/025 |

(Continued)

FOREIGN PATENT DOCUMENTS

| CN | 101874404 A | * 10/2010 | ............. G06F 3/017 |
| CN | 105959923 A | * 9/2016 | |

(Continued)

OTHER PUBLICATIONS

IP.IQ.com Search. (Year: 2021).*

(Continued)

*Primary Examiner* — Tan D Nguyen

(74) *Attorney, Agent, or Firm* — Kilpatrick Townsend & Stockton LLP

(57) ABSTRACT

Provided herein is a holistic fraud cocoon that protects a user from incoming or outgoing fraud and phishing communications by capturing, analyzing and either altering, discarding or presenting communications to the user. For example, the holistic fraud cocoon captures all incoming sources (mail, in-person visits, phone, TV, radio, newspapers and internet)

(Continued)

and the actions performed by the user, triggered by those sources. Certain actions are held in a queue to be reviewed, validated and acted upon by a third party before the actions are executed.

18 Claims, 10 Drawing Sheets

(56) References Cited

U.S. PATENT DOCUMENTS

| | | | |
|---|---|---|---|
| 2007/0203693 A1* | 8/2007 | Estes | G06N 3/08 704/9 |
| 2008/0077515 A1* | 3/2008 | Zoldi | G06Q 40/02 705/35 |
| 2009/0037378 A1* | 2/2009 | Moor | G06F 16/248 |
| 2012/0005749 A1* | 1/2012 | Zoldi | G06Q 40/00 726/22 |
| 2013/0275862 A1* | 10/2013 | Adra | H04L 51/04 715/234 |
| 2015/0200964 A1* | 7/2015 | Kariman | H04L 63/18 726/3 |
| 2015/0358293 A1* | 12/2015 | Wood | H04L 63/0272 726/4 |
| 2017/0017962 A1* | 1/2017 | Knoblauch | G06F 9/00 |
| 2017/0353404 A1* | 12/2017 | Hodge | H04L 67/22 |

FOREIGN PATENT DOCUMENTS

| | | | | |
|---|---|---|---|---|
| EP | 3404875 A1 | * | 11/2018 | |
| KR | 1731867 B1 | * | 5/2017 | |
| WO | WO-2012135048 A2 | * | 10/2012 | G06Q 30/02 |
| WO | WO-2013080024 A2 | * | 6/2013 | G16H 40/67 |

OTHER PUBLICATIONS

Wang, J-H, "Technology-based Financial Frauds in Taiwan: Issues and Approaches", Oct. 1, 2006, 2006 IEEE International Conference on Systems, man and Cybernetics, vol. 2, pp. 1120-1124. (Year: 2006).*

George M. Grimes, "Analysis of Human Computer Interaction Behavior . . . Assessment of Affect, Cognitive Load, and Credibility", 2015, Department of Management Information Systems, University of Arizona, 2015, pp. 1-23. (Year: 2015).*

Bjornhed, Joakim, "Using a Chatbot to prevent Identity Fraud by Social Engineering", 2009, University of Skovde, School of Humanities and Informatics, p. 1. (Year: 2009).*

Vishal Gupta "A Survey of Text Mining Techniques and Applications", Aug. 2009, Journal of Emerging Technologies in Web Intelligence, vol. 1, No. 1, pp. 60-76. (Year: 2009).*

* cited by examiner

HOLISTIC FRAUD COCOON

BACKGROUND

Access to money, identity, social security, physical stamps, and so on are being threatened. Individuals who have diminished capabilities due to aging, mental health or addiction are commonly the targets of such threats. Many individuals may be inundated by requests for money from a variety of different sources channels. Individuals who have mental health or addiction issues may be forced or tricked into action by fraudsters who are taking advantage of these individuals. At the same time, wresting all control and communications from the individual might be detrimental to the individual. Currently, there is no middle ground between diverting all communications and diverting some communications, from all sources. Also, there is currently no way to double-check actions by the individual to determine if the actions were triggered by a fraudulent communication.

SUMMARY

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

The various aspects provided herein are related to a holistic fraud cocoon. An aspect relates to a system comprising a processor and a memory that stores executable instructions that, when executed by the processor, facilitate performance of operations. The operations include monitoring a communication associated with an identified individual and analyzing the communication based on a filtering criteria predefined by the individual or a trusted third party. The analyzing indicates whether the communication is fraudulent or if no fraud is detected. The operations also include performing at least one of: allowing an action associated with the communication based on no fraud being detected, or denying the action associated with the communication based on the communication being fraudulent.

Another aspect relates to a method that includes monitoring, by a system comprising a processor, a communication associated with an identified individual. The method also includes analyzing, by the system, the communication based on a filtering criteria predefined by the individual or a trusted third party, the analyzing indicates whether the communication is fraudulent or if no fraud is detected. Further, the method includes performing, by the system, at least one of: allowing an action associated with the communication based on no fraud being detected, or denying the action associated with the communication based on the communication being fraudulent.

Yet another aspect relates to a computer-readable storage device that stores executable instructions that, in response to execution, cause a system comprising a processor to perform operations. The operations include monitoring a communication associated with an identified individual and analyzing the communication based on a filtering criteria predefined by the individual or a trusted third party. The analysis indicates whether the communication is fraudulent or if no fraud is detected. The operations also include allowing an action associated with the communication based on no fraud being detected, or denying the action associated with the communication based on the communication being fraudulent.

To the accomplishment of the foregoing and related ends, certain illustrative aspects of the innovation are described herein in connection with the following description and the annexed drawings. These aspects are indicative, however, of but a few of the various ways in which the principles of the innovation may be employed and the subject innovation is intended to include all such aspects and their equivalents. Other advantages and novel features of the innovation will become apparent from the following detailed description of the innovation when considered in conjunction with the drawings.

BRIEF DESCRIPTION OF THE DRAWINGS

Various non-limiting embodiments are further described with reference to the accompanying drawings in which.

DETAILED DESCRIPTION

Figure 1:
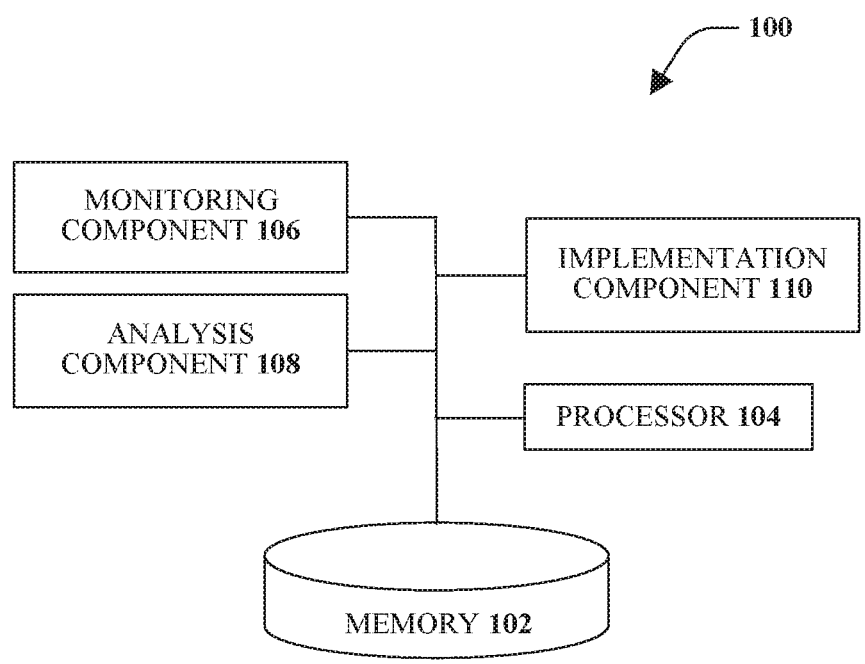
FIG. 1 illustrates an example, non-limiting system configured to provide a holistic fraud cocoon, according to an aspect.

The innovation is now described with reference to the drawings. In the following description, for purposes of explanation, numerous specific details are set forth in order to provide a thorough understanding of the subject innovation. It may be evident, however, that the innovation may be practiced without these specific details. In other instances, well-known structures and devices are shown in block diagram form in order to facilitate describing the innovation.

The various aspects discussed herein relate to a holistic fraud cocoon that captures both incoming and outgoing communications to and from a customer or user. The holistic fraud cocoon may provide a filtered set of the communications to the customer, based on predefined rules established by the customer or the customer's caregiver. The incoming communications may include, but are not limited to a phone, a television, a radio, an in-person visit, paper mail, electronic mail, the Internet, and so on. The incoming communications are also available from existing home surveillance/monitoring.

While the stages are described individually herein, it is to be appreciated that aspects exist whereas each stage occurs sequentially in the use case. As described herein, the description separates aspects into three separate 'stages.' It is to be understood that the innovation can combine these stages in numerical series (i.e., 1 followed by 2 followed by 3).

According to an implementation, activity grouping and actions may be implemented (e.g., Stage 1). Through monitoring, analytics, recognition, and prediction incoming activity (e.g., communications) may be routed into groupings. The groupings may have different rule sets and actions so that customers with various limitations may be provided with enhanced assistance to facilitate their desired actions. Additionally or alternatively, the groupings may indicate communications that should be routed for third party assistance where rules dictate intervention by the third party.

As described herein, in accordance with some of the aspect(s) disclosed, Stage 1/Stage 2/Stage 3 are part of a pipeline—e.g., they are not exclusive of each other—instead one follows the other. In other words, stage 2 happens after stage 1 and stage 3 happens after stage 2.

In another implementation, the various aspects provide machine based determination of support assistance (e.g., Stage 2). For example, the determination of the types of supportive assistance may be automated. Further, one or more rules may be established based on a virtual-interactive assessment of the customer and the designated custodian (using audio, video and text/handwriting inputs, for example). The assessments may be utilized to establish the initial support devices and system configuration. The system then adapts through machine learning.

In another implementation, the various aspects provide machine based determination of actions a customer is attempting to take (e.g., Stage 3). Based on this determination assistance may be provided to the customer by alerting against risky practices. The various aspects may be configured to monitor in real time the allowed actions of the customer and alert the customer about errors or risky practices. The determination of whether to output an alert may be made based on going through an interactive audible dialogue in the form of a check list or reminders when certain actions are observed (e.g., writing a check, filling out a form, preparing items for mailing, preparing cash payments, and so on).

FIG. 1 illustrates an example, non-limiting system 100 configured to provide a holistic fraud cocoon, according to an aspect. As attacks on customers become more sophisticated, and customers age, it becomes important for a financial entity (such as a bank) to be able to provide a holistic protection service which may capture and manage all incoming and outgoing communications from a customer, and confirm that those communications do not trigger actions which may cause an undesirable effect on the customer's financial health.

The following provides an example, non-limiting use case example of the various aspects discussed herein. Mario's father has just moved from his home into a small apartment and he is being besieged by requests from charities for contributions. The charities call him; send him postal mail and emails. As Mario's father's mental health is failing, he writes checks for each of the incoming letters, and if Mario had not stopped by to visit, he would have sent out a substantial portion of his monthly social security check. Mario enrolls his father in the holistic fraud cocoon, and is shipped a number of devices, based on his father's current mental and physical state. He places those devices in his father's home as described by the service, in order to capture the communications. In one scenario of the embodiment, now Mario is notified when his father gets phone calls (and the calls are automatically diverted away before the phone even rings). In another scenario of the embodiment, when Mario's father opens his mail he now feeds it through a scanner to determine if the mail is valid, and may pay it directly from the screen of the scanner device. In yet another scenario of the embodiment, if Mario's father does end up attempting to buy something from a late night infomercial that purchase is held until Mario approves the purchase.

The various aspects provided herein include the ability to fully cocoon the customer in a secure environment driven by machine learning using a combination of sensors, human approvals and third party assistance. Also provided is the ability to address the needs of customers who may have mental and physical health issues. The various aspects also provide the ability to alert third parties and power of attorneys if there are any substantial changes to the customer's behavior or if there is any threat detected to the customer.

The system 100 may include at least one memory 102 that may store computer executable components and/or computer executable instructions. The system 100 may also include at least one processor 104, communicatively coupled to the at least one memory 102. The at least one processor 104 may facilitate execution of the computer executable components and/or the computer executable instructions stored in the at least one memory 102. The term "coupled" or variants thereof may include various communications including, but not limited to, direct communications, indirect communications, wired communications, and/or wireless communications.

It is noted that although the one or more computer executable components and/or computer executable instructions may be illustrated and described herein as components and/or instructions separate from the at least one memory 102 (e.g., operatively connected to the at least one memory 102), the various aspects are not limited to this implementation. Instead, in accordance with various implementations, the one or more computer executable components and/or the one or more computer executable instructions may be stored in (or integrated within) the at least one memory 102. Further, while various components and/or instructions have been illustrated as separate components and/or as separate instructions, in some implementations, multiple components and/or multiple instructions may be implemented as a single component or as a single instruction. Further, a single component and/or a single instruction may be implemented as multiple components and/or as multiple instructions without departing from the example embodiments.

Also included in the system 100 may be a monitoring component 106 that may be configured to monitor a communication associated with an identified individual (e.g., a user, a customer, and so on). The communication may be an incoming communication, an outgoing communication, or combinations thereof. In an example, the communication may be captured by one or more sensors located within an environment of the identified individual. Examples of sensors include phone, television, radio, in-person visits (e.g., based on a camera located at an entrance), paper mail (e.g., captured by a scanner), online or Internet (e.g., captured by a computing device), security systems or other home monitoring devices. Other examples of sensors include standalone devices and sensors, such as Bluetooth speakers, microphone, video cameras, and so on.

An analysis component 108 may be configured to analyze the communication in real-time or at other times. According to some implementations, the analysis component 108 may analyze the communication based on a filtering criteria predefined by the individual or a trusted third party. The analyzing by the analysis component 108 may indicate whether the communication is fraudulent or if no fraud is detected For example, the communication may be a person arriving at a person's home. At about the same time as the visitor rings a doorbell, the monitoring component 106 may capture an image of the visitor and the analysis component 108 may evaluate the visitor based on the image. For example, the analysis component 108 may compare the image to other images stored in a database of trusted individuals and/or individuals determined to be fraudsters or criminals.

Additionally or alternatively, verbal communication may be analyzed based on the individual answering the door or based on a microphone/speaker setup (where the user engaging in the operation is located locally or remotely). The verbal communication may be analyzed by the analysis component 108 based on a trigger, which may be key words or phrases, voice inflection, voice stress, tonal analysis, and so on.

In an additional or alternative implementation, the analysis component 108 may utilize non-verbal communication as the trigger to make a determination whether the communication is potentially fraudulent or not. Non-verbal communication may include body language, items the visitor is holding (e.g., is it a clipboard or a crowbar), whether the visitor is attempting to gain access to the house (e.g., rattling a door handling, using the crowbar to pry open the door), or other suspicious actions (looking all around for a means to gain access), and so on.

Based on the analysis performed by the analysis component 108, an implementation component 110 may be configured to allow or deny an action associated with the communication. For example, the implementation component 110 may be configured to allow the action associated with the communication based on no fraud being detected by the analysis component 108. In some implementations, allowing the action may include discarding the communication prior to the individual receiving the communication.

Alternatively or additionally, allowing the action may include completing a revised action based on evaluation of the revised action and an impact associated with the revised action. Further to this implementation, allowing the action may include removing a portion of the communication prior to the communication being consumed by the individual. According to some implementations, completing the revised action may include insert a signal with the communication, the signal alerts the individual to suspected fraud. Alternatively or additionally, completing the revised action may include diverting the communication from the individual to a trusted third-party.

Alternatively, the implementation component 110 may be configured to deny the action associated with the communication based on the communication being fraudulent as determined by the analysis component 108.

According to the implementations where the communication is allowed to complete in its entirety or in a revised form, the system 100 may continue to monitor the communication during a duration of the communication. If potential fraud is detected during any portion of the duration of the communication, the communication may be stopped, diverted to a trusted third-party, or another action may be performed as discussed herein.

The following is an example, non-limiting first use case scenario related to mail solicitations that appear to be fraudulent. The input sources may be a surveillance camera security camera with a microphone/web cam with audio and/or a mobile device that communicates with the monitoring component 106. An input event-object recognition analysis (e.g., the analysis component 108) determines the customer is opening mail. Thus, an interactive chatbot dialog, for example, suggests that the customer hold the first page in front of camera and the control software zooms in, converts the image to text and audibly prompts the customer to hold up a next page or indicate there are no additional pages.

For an output event, the type of document in the image is filed (e.g., retained) along with the logging of the recommended action. The analytics system determines that the document appears fraudulent and notifies the client to set the document aside while the system contacts the custodian for final confirmation. Once confirmed that no action should be taken, the client is instructed to put the document in a color-coded shred bin. The metadata about the document and the disposition or the actionable insight is saved to history for machine learning.

According to Stage 1: a customer profile establishes the need to capture and analyze mail as the client (a.k.a. the customer) has very poor vision; however the customer has mental awareness but needs decision assistance. In addition, the client may hear if speech is loud crisp and slow. The profile initiates task monitoring via video capture. Computer vision recognizes the client task, which triggers the chatbot to guide the client through needed actions. The object recognition/focus and text capture output of each page is sent to the cocoon engine for analysis.

According to Stage 2: the cocoon engine has access to history and uses context and similarity analysis to determine if the document has been previously dispositioned or if it is a new document. Since in this example the document is new, the images, logos, graphics and text or handwriting is fully analyzed and matched to rules and current fraud profiles for this type correspondence. Finally, the content is analyzed for the context and the intent of the message. Since this is a solicitation, the names, web sites and phone numbers are analyzed/tested for legitimacy and in they are legitimate business. Further, the location of the sources is traced.

According to Stage 3: the resulting analytic analysis and risk information is then dynamically built into an easy to understand narrative message that is sent to the custodian since the analysis indicated it is asking for payment and it has a high risk of being bogus even though it appeared as being from a sponsor the client likes. The designated email location for payment is a very recently detected fraud site. Through a text answer, the custodian authorizes the document to be shredded. The chatbot instructs the customer as to where to place the document and explains why in a narrative form.

Thus, the first use case scenario related to mail solicitations that appear to be fraudulent may be configured to link a customer capabilities profile to appropriate computer assisted help to alert the customer who has physical/mental limitations to fraud. The system also initiates the appropriate needed actions along with directing the customer with tailored actions including an explanation of why they need to do it.

The following is an example, non-limiting second use case scenario related to door solicitation. The inputs may be received from a surveillance camera/security camera with microphone, for example. The input event may be a push button (e.g., doorbell) and/or sensing the presence of an individual. An output event may be that the system joins the conversation or the door is opened or custodian/caretaker is added to the conversation or armed response is sent to the door.

According to Stage 1, the output from the surveillance camera is tagged with reference to the senior (e.g., senior details) and is sent to an analytics engine. The output from the surveillance camera may either be the images and/or the conversation between the person at the door and the senior, which are sent to the analytics engine.

In accordance with Stage 2, the analytics engine has semi-supervised learning and may recognize the ongoing conversation to understand the context. If there is image or video input, the analytics engine will try to recognize the visitor. The analytics engine then might join the conversation if it determines it needs answers to question it has for the visitor. However, the analytics engine might decide on various other actions.

According to Stage 3, the analytics engine has output of the image/video recognition. If the analytics engine had decided the visitor is unsafe, the output might be to ask the visitor to leave the premises and/or send armed response. The analytics engine inserts itself into the conversation to ask questions to the visitor or explain the circumstances to the senior (and will return to Stage 2). In a similar manner, the corrective measure at any stage might be to bring in the custodian/caretaker into the call (and will return to Stage 2).

The analytics engine is agnostic of the input type, as long as the input is tagged. The analytics engine understands and responds to the input and generates an appropriate output. The analytics engine overcomes the limitations of having separate systems for each input. Further, the various aspects discussed herein disclose the learning with one input set of data, which may be correlated with the learning from another input set of data. New inputs in the future may also be handled according to the various aspects.

The following is an example, non-limiting third use case scenario related to machine based determination of supportive assistance. In this example, the input sources may be a surveillance camera/security camera with microphone/web cam with audio and/or a communications device.

Baseline movement patterns are created based on typical movement and action patterns of an individual of a similar age, gender and infirmity. The movement patterns are utilized as the communication. The customer is compared against these patterns in order to determine if the customer is functioning physically normally, above, below or at the same level as a baseline individual. The customer's patterns are determined through observation using their sensor enabled home, and via chatbot based communications with the customer.

For example, assume that the customer is acting above normal for baseline in most areas, and then over time, the system begins to detect hearing deterioration, based on the customer beginning to ask the system to repeat audio prompts or increase the volume of the audio prompts. As this is detected and the audio issues begin to pass a certain threshold, then medical personnel and third party caregivers are informed. The informed persons may then make a determination if the customer requires a hearing aid or other augmentation. Further, the system continues to adapt to the customer's changes in physical and mental ability over time.

Thus, according to this third example, the various aspects provide the ability to detect and adapt to changes in the customer's physical and mental state via sensor based input and machine learning, triggering adaptive communications within a threshold.

The following is an example, non-limiting fourth use case scenario related to a machine based determination of actions a customer is trying to take, and then assist by alerting against risky practices. In this example the input sources may be a surveillance camera/security camera with microphone/web cam with audio, a communications devices, eyeglass mounted camera, and so on.

When the system detects that the customer is about to complete a specific task, an audio/visual or kinesthetically powered chatbot may provide assistance to the customer so that they may assist in the completion of that task. The chatbot based assistance may begin if the system detects the customer is having an issue with completing the task, or simply as a guide who begins to assist the customer as they begin to complete the task. If configured, the guide may be disabled by the customer during the process.

For example, one embodiment might include an eyeglass mounted camera which is connected to the system. This camera is connected to the system via Bluetooth or some other wireless protocol, and positioned in order to allow the system to see what the customer is seeing. This camera sensor, in combination with the sensors in the home, should be able to detect the customer's actions. For example, the customer might be in the process of writing a check. The eyeglass mounted camera would be able to detect that the customer is writing a check, and be able to determine if they are writing it out correctly, or may be writing a check of a large amount, or a check to an unknown party. If the system detects an anomaly, it will initiate a chatbot session with the customer in order to ask if the customer requires any assistance with the procedure which they are undertaking. If the customer agrees, then the chatbot will assist the customer to complete the task as required. If the customer declines, then a third party or caregiver may be informed. Thus, according to this fourth use case, the various aspects may provide the ability to detect and guide the customer to complete tasks in the physical world by detecting the task that the customer is attempting to complete and providing assistance through appropriate means.

Figure 2:
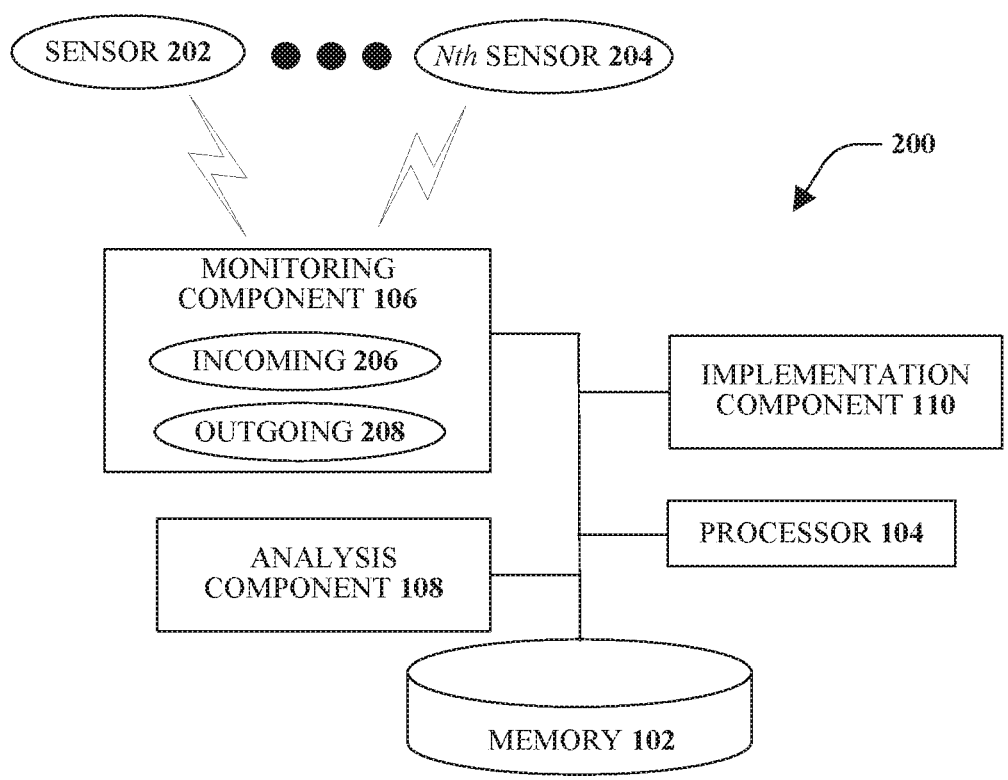
FIG. 2 illustrates an example, non-limiting system that captures one or more communications in order to provide a holistic fraud cocoon, according to an aspect.

FIG. 2 illustrates an example, non-limiting system 200 that captures one or more communications in order to provide a holistic fraud cocoon, according to an aspect. As illustrated, the monitoring component 106 may be configured to receive information from one or more sensors, illustrated as a first sensor 202 through an Nth sensor 204, where N is an integer.

The sensors 202, 204 may be configured to monitor one or more incoming communications 206, one or more outgoing communications 208, or combinations thereof. The one or more incoming communications may be monitored by using a single sensor or a combination of sensors. The sensors may include but are not limited to audio, video, haptic, and olfactory sensors which may detect visuals, sounds, movement, and/or odor. These sensors may be standalone hardware based sensors, which may be Internet connected, may be battery or line powered, and/or may contain a number of purpose built sensors. In an embodiment, the sensor may be a single device or a collection of video and audio capture devices, strategically placed to capture the majority of the incoming and outgoing communications.

Different communications types may utilize different sensors, some of which may be software only, or a hardware/software combination. For example, paper mail may be captured by inserting the paper mail into a scanning device, or simply may be captured using an application on a customer's communication device.

According to some implementations, for each method (or different type) of incoming communications, a different capture methodology or device may be used. For example, a telephone application that records the conversation, or microphone attached to landline phone, or add-on for a VOIP (Voice Over Internet Protocol) service which captures the conversation may be utilized.

In another example related to a television communication, a hardware device which "watches" a television's content may be utilized. The hardware device may look for trigger content. Additionally or alternatively, the television communication may be associated with a monitoring service the captures what is currently being played from the customer's set-top box (e.g., a smart television). As it relates to a radio communication, a hardware device (or monitoring service) that "listens" to the radio and captures the audio may be utilized.

For in-person visits, a device located on or near a door may detect recognized individuals. Additionally or alternatively, an audio/video capture device in the home that "listens in" on the conversation and will then trigger alerts or warnings to the customer or the customers caregivers if required may be utilized.

For paper mail, a scanner may be utilized. The user may feed incoming mail through the scanner. The scanner may include an appropriate on-board display to indicate legitimate mail. Alternatively, an application may be utilized (e.g., through the user's device) to take a photo of the paper mail and upload the image to the system 200 (e.g., to the monitoring component 106).

For online activity (e.g., activity over the Internet), software may be installed on the user's device. The software may scan and capture what the customer is currently reading. A device may also be called, and may contain some or all of the functionality of a system, subscriber unit, subscriber station, mobile station, mobile, mobile device, wireless terminal, device, remote station, remote terminal, access terminal, user terminal, terminal, wireless communication device, wireless communication apparatus, user agent, user device, or user equipment (UE). A mobile device may be a cellular telephone, a cordless telephone, a Session Initiation Protocol (SIP) phone, a smart phone, a feature phone, a wireless local loop (WLL) station, a personal digital assistant (PDA), a laptop, a handheld communication device, a handheld computing device, a netbook, a tablet, a satellite radio, a data card, a wireless modem card, and/or another processing device for communicating over a wireless system. Further, although discussed with respect to wireless devices, the disclosed aspects may also be implemented with wired devices, or with both wired and wireless devices.

According to some implementations, the sensors 202, 204 may be security systems and/or other home monitoring devices. Additionally or alternatively, the sensors 202, 204 may be standalone devices and sensors (e.g., Bluetooth speakers, microphones, video cameras, and so on). The sensors 202, 204 may be other data collection devices, although such devices are not described within this detailed disclosure. The Sensors 202, 204 may be Internet of Things class of devices to acquire data directly related to the physical world such as RFID Tags for identification and proximity sensors for positon/presence/proximity. The Sensors 202, 204 may have functional components particularly (i) Sensing Module such as Light Sensors, Accelerometers or the like, e.g., (ii) Sensor Communication Module such as Radio Transceiver (iii) Energy Storage Module such as Li-Ion Battery, Energy Harvesting circuits . . . and (iv) Computing Module such as Controller. The Sensors 202, 204 may also be co-located with Actuators such as Smoke sensor with an audible alarm. In such embodiments, the monitoring component 106 also consists of sensor fusion abilities; sensor fusion is combining of sensory data acquired from disparate sensors/sources.

The outgoing communications 208 may include similar communications as those described with respect to the incoming communications. The customer's outgoing communications are also monitored in order to ensure that the customer is not undertaking an undesirable action, which may have been triggered by one or more of the incoming communications 206. The outgoing communication may also drive Actuators such as Motorized window blind.

For example, a user's telephone or other communication device may be monitored for calls that include requests that might trigger actions. In-person visits may be monitored and if the customer agrees, or seems to be moving down the path of agreeing to the visitor's requests (assuming that the customer should not be doing so), the customer and/or the caregiver is alerted and may decide to modify their communications. In another example, for online communications, the user's device may be scanned for outgoing actions and those actions may be held in queue for caregiver approval or automatic approval, as appropriate.

The following describes example individual sensors and trackers, leading to unique combinations for individual requirements. Although various combinations are discusses, it is possible in different embodiments to reduce the numbers of sensors and devices by combining the hardware into multisensory devices. Additionally, not all of the sensors and trackers below may be required, based on the individual customer's situation.

Stages that constitute data ingestion, such as digitization, (cataloging, tagging, labeling), indexing and routed to analytics pipeline before eventual data storage. Further, the sensors may continually monitor, from initiation of an activity (phone call or TV voice message phone number) to the end of an activity, resulting in alerting and/or deterrence/abruptly discontinue the on-going activity.

The system may also leverage pre-existing in-home devices that monitor as part of their regular operation. Devices may contain both microphones and cameras in an always-on state in order to provide services and home security. As these devices become more and more embedded in homes, there may be lesser need for the individual tracking and sensor devices. For example, a home monitoring device may "listen in" on an in-person conversation, deliver the results to the analytics engine, which may then ingest the data, analyze the data, develop possible responses, and communicate those responses to the customer in order for them to take action. The device itself may also take action if it deems action necessary, by calling the staff, authorities, or directly advising the visitor or the customer to end the conversation.

In an example phone situation, an application that may record phone conversations on smartphone may be utilized. Alternatively, a hardware device that attaches to a landline phone and records both sides of a conversation may be utilized. In some implementations, software that will monitor a VOIP connection in order to capture conversations may be utilized. Further, the device utilized may have the ability to upload captured data via pipeline to the analytics engine.

For a television example situation, the devices may include a hardware device which captures video and audio content from a television. Another example is software which captures what the customer is viewing, based on set-top box device log output. The devices should have the ability to upload captured data via pipeline to the analytics engine.

In a radio situation, the devices may include a hardware device which captures audio content from the radio. In some implementations, a smartphone or tablet software application which may capture ambient sound may be utilized. The device utilized should have the ability to upload captured data via pipeline to the analytics engine.

For an in-person visit situation, the devices may include a hardware device which captures video and audio from outside the home (e.g., front door) in order to identify visitors. In some implementations, the hardware device may capture video and audio content from inside room. Also utilized may be a smartphone or tablet software application which may capture ambient sound and video. The devices should have the ability to upload captured data via pipeline to the analytics engine.

For paper mail, the devices may include a hardware device which may capture an image of the paper mail, similar to a scanner (feed slot or a flatbed scanner). Another device may be a smartphone or tablet based software application which may capture the image of the paper mail. The devices should have the ability to upload captured data via pipeline to the analytics engine.

In an online scenario, the device may include a software application which runs on both computer, tablet or smartphone, which may monitor both incoming and outgoing communications, including but not limited to: web browsing, application usage, text messaging, chat messaging, and so on. The devices should have the ability to upload captured data via pipeline to the analytics engine.

A home surveillance system may include two way interactions over a potentially separate channel/out-of-band from the primary data feed. Other devices may also be utilized, such as standalone sensors, pre-existing capture devices and any other sensing devices.

Figure 3:
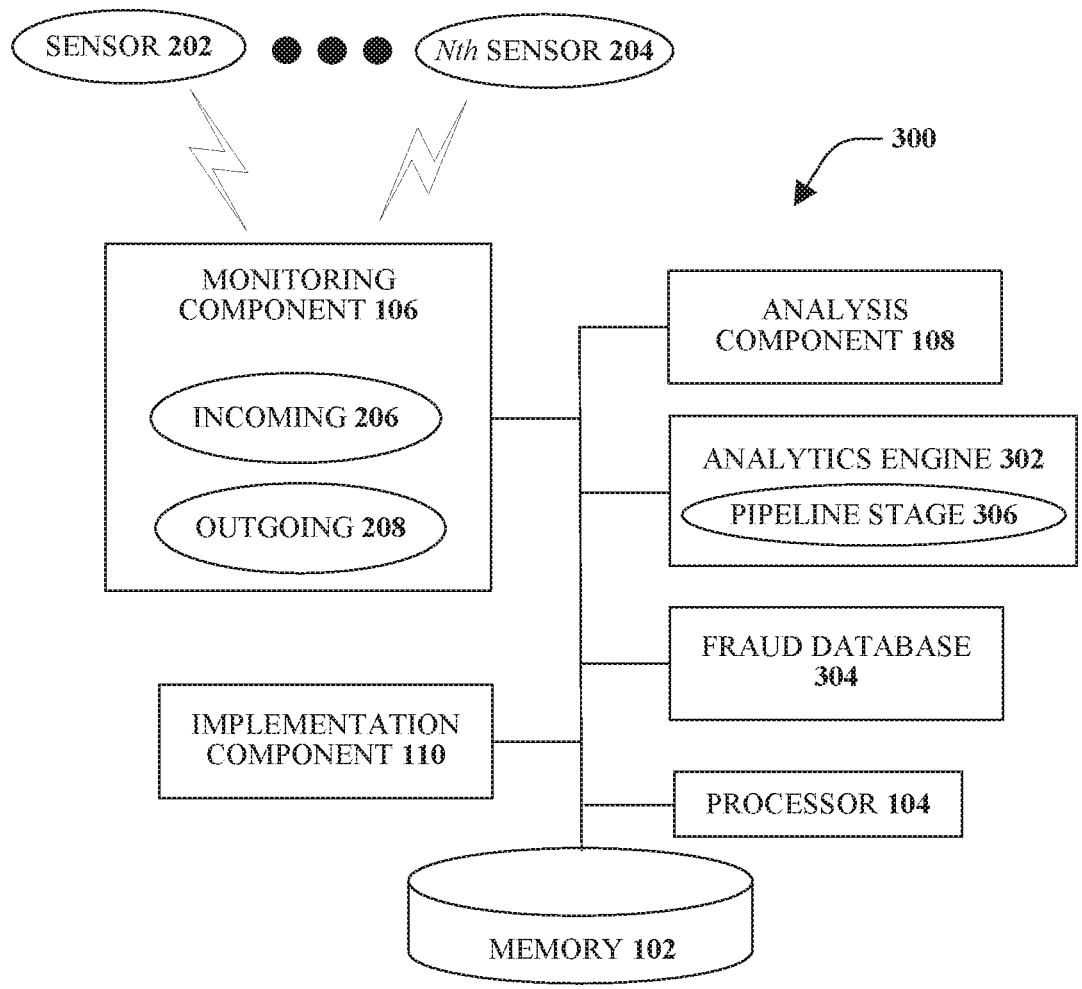
FIG. 3 illustrates an example, non-limiting system configured to analyze communications to facilitate a holistic fraud cocoon, according to an aspect.

FIG. 3 illustrates an example, non-limiting system 300 configured to analyze communications to facilitate a holistic fraud cocoon, according to an aspect. In order to analyze the various communications, the system 300 may include an analytics engine 302 (sometimes referred to as cocoon engine or simply engine) and a fraud database 304.

The analytics engine 302 may include a pipeline stage 306 that may be configured to perform data ingestion/streaming, analytics, and cognitive functions that include clustering and prediction, and learning aspects. The pipeline stage 306 may be also configured to manage unhealthy financial activities. For example, the pipeline stage 306 may be configured to mitigate undesired movement of currency and funds and/or to mitigate negative financial impact (stress on financial aspects to distinguish from health monitoring systems).

The analytics engine 302 may perform various types of analytics including video analytics, image analytics, input data processing analytics, and so on. In an example, speech and/or audio analytics may provide insight into mood, behavior, feelings, and so on. Image and/or video analytics may assist in object identification, object recognition, mood and behavior analysis, and so on.

According to some implementations, the analytics engine 302 may be configured to perform cognitive computing, which may follow or interpret the analysis to make one or more predictions. For example, the analytics engine 302 may construct a model (or representation) with the intent, inference, and context of the action. Based on the model, the analytics engine 302 may make a determination whether it is a fraudulent situation (e.g., based on a fraud module), whether it is a trusted person, the probability of it be a trusted interaction, is the interaction being repeated, and so on. The models may be designed to make an integration prediction (e.g., does the action need review, should it be allowed or stopped).

The fraud database 304 may include information related to known fraud events (e.g., fraud communications) and/or known legitimate events (e.g., identification of family members, friends, coworkers, and so on). The information may also relate to activities that may be considered suspicious (e.g., an email from the Internal Revenue Service, an email that appears to be a phishing email, a commercial that plays on the user's emotions, and so on). The information retained in the fraud database 304 may be in one or more formats including, for example, a database of textual, visual, auditory, and/or other objects which have been deemed both legitimate and illegitimate.

The analysis component 108 may compare the data within the fraud database 304 and/or the model generated by the analytics engine 302 to make a determination whether the communication should be allowed, denied, altered, or whether another action should be taken. The other action may include alerting a third-party (e.g., a friend, a family member, a financial institute, law enforcement personnel, and so on). Further, if the communication is allowed, at least in part, during the duration of the communication the system 300 may continue to monitor the communication for any potential fraudulent activity. For example, a family member may be in communication with the user, however, the family member although indicated as a trusted person, may attempt to take advantage of the user (e.g., ask for the user's credit card). Based on this request, the system 300 may alert the user and/or another trusted person as to this request, as it is suspicious.

Figure 4:
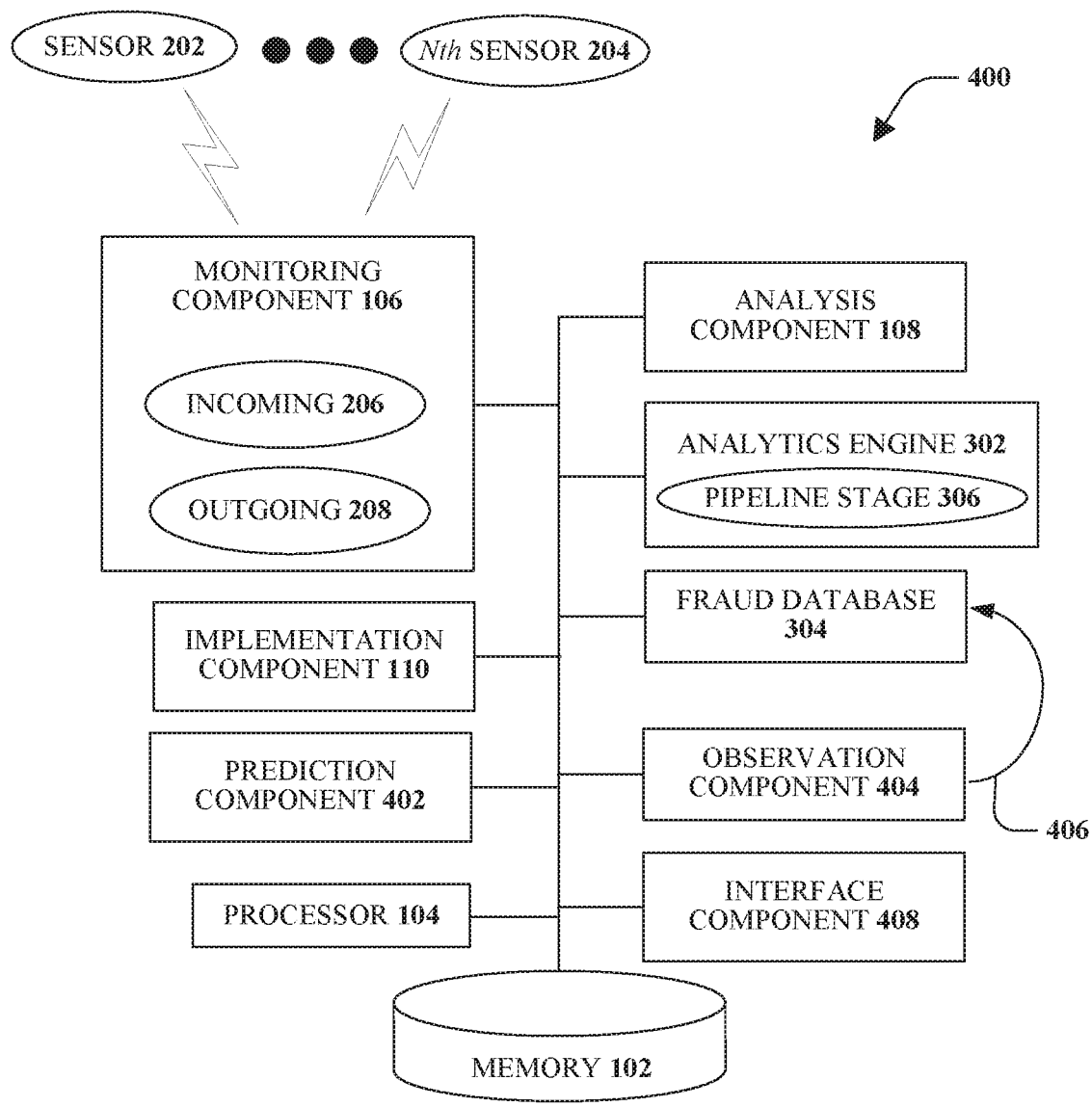
FIG. 4 illustrates an example, non-limiting system that utilizes a feedback loop for refinement of a holistic fraud cocoon, according to an aspect.

FIG. 4 illustrates an example, non-limiting system 400 that utilizes a feedback loop for refinement of a holistic fraud cocoon, according to an aspect. As illustrated, a prediction component 402 may be configured to make a determination as to whether a particular communication or interaction is fraudulent or not. For example, the prediction component 402 may evaluate a model created by the analytics engine 302 and determine if fraud is likely to occur if a communication is allowed to proceed with (or without) further action. Based on this prediction or estimation of what is likely to occur, the implementation component 110 may perform one or more actions (e.g., allow the communication, alter the communication, bypass the intended recipient of the communication, and so on).

During the communication and/or after completion of the communication, an observation component 404 may be configured to determine the outcome of the communication. For example, if the communication was allowed to proceed, but fraud did occur, the observation component 404 may determine the fraud based on a subsequent communication (e.g., a different conversation, a call to the police, detection of fraudulent charges on a credit card, and so on). In a similar manner, the communication may have been determined to be fraudulent and the intended recipient may have been bypass. Thus, the communication was routed to a trusted third-party. After the third-party interacted with the person and/or other type of communication (e.g., email, commercial, paper mail, and so on), the third-party may determine that the communication is legitimate. This information may also be determined by the observation component 404.

The information related to whether the communication was processed correctly or incorrectly may be relayed to the fraud database 304 through a feedback loop 406. Accordingly, the system 400 may learn and adapt future determinations (e.g., may refine the one or more models). Such adaptions may create a more robust system 400 that has a higher percentage of accurate determinations related to the communication. Further, the system 400 has the ability to capture new objects and add the new objects to the database (e.g., learning aspect for the feedback loop 406). The object may include any type of information (e.g., verbal, visual, haptic, and so on.) Further, the system 400 may be configured to compare new objects with current objects.

An interface component 408 may also be included in the system 400. The interface component 408 may be configured to allow customers and/or others (e.g., third parties, administrative personnel, and so on) to flag objects. According to some implementations, one or more communications and/or portions of a communication may be flag or marked to indicate suspicious activity.

Further, the user (or others) may utilize the interface component 408 to convert objects from one form to another in order to assist in the matching process (e.g., comparison between a current communication and objects or information determined to indicate a fraudulent communication).

The interface component 408 may be a web based administrative interface that allows third parties, or the customer, to establish rules and triggers for both incoming and outgoing communications. Further, the interface component 408 may be configured to output a queue of actions for third parties to review and approve/deny actions made by the customer.

According to some implementations, the interface component 408 (as well as other interface components discussed herein) may provide a graphical user interface (GUI), a command line interface, a speech interface, Natural Language text interface, and the like. For example, a Graphical User Interface (GUI) may be rendered that provides a user with a region or means to load, import, select, read, and so forth, various requests and may include a region to present the results of the various requests. These regions may include known text and/or graphic regions that include dialogue boxes, static controls, drop-down-menus, list boxes, pop-up menus, as edit controls, combo boxes, radio buttons, check boxes, push buttons, graphic boxes, and so on. In addition, utilities to facilitate the information conveyance, such as vertical and/or horizontal scroll bars for navigation and toolbar buttons to determine whether a region will be viewable, may be employed. Thus, it might be inferred that the user did want the action performed.

The user may also interact with the regions to select and provide information through various devices such as a mouse, a roller ball, a keypad, a keyboard, a pen, gestures captured with a camera, a touch screen, and/or voice activation, for example. According to an aspect, a mechanism, such as a push button or the enter key on the keyboard, may be employed subsequent to entering the information in order to initiate information conveyance. However, it is to be appreciated that the disclosed aspects are not so limited. For example, merely highlighting a check box may initiate information conveyance. In another example, a command line interface may be employed. For example, the command line interface may prompt the user for information by providing a text message, producing an audio tone, or the like. The user may then provide suitable information, such as alphanumeric input corresponding to an option provided in the interface prompt or an answer to a question posed in the prompt. It is to be appreciated that the command line interface may be employed in connection with a GUI and/or Application Program Interface (API). In addition, the command line interface may be employed in connection with hardware (e.g., video cards) and/or displays (e.g., black and white, and Video Graphics Array (EGA)) with limited graphic support, and/or low bandwidth communication channels.

According to an implementation, the system 400 may be configured with the ability to sense and provide an early warning system to the customer's family, caregivers and doctors, if the system senses a material change to the customers mental or physical state.

In accordance with another implementation, the system 400 may be configured with the ability to communicate with the customer in the way which they wish to be communicated to. The system 400 may also provide a translation service from format to format, depending on the customers preferred, or effective, method of communications.

In further implementations, the system 400 may be integrated with a home security system to communicate with the individual or deliver assistance using methods provided by the home security system or other third party systems already in place.

Figure 5:
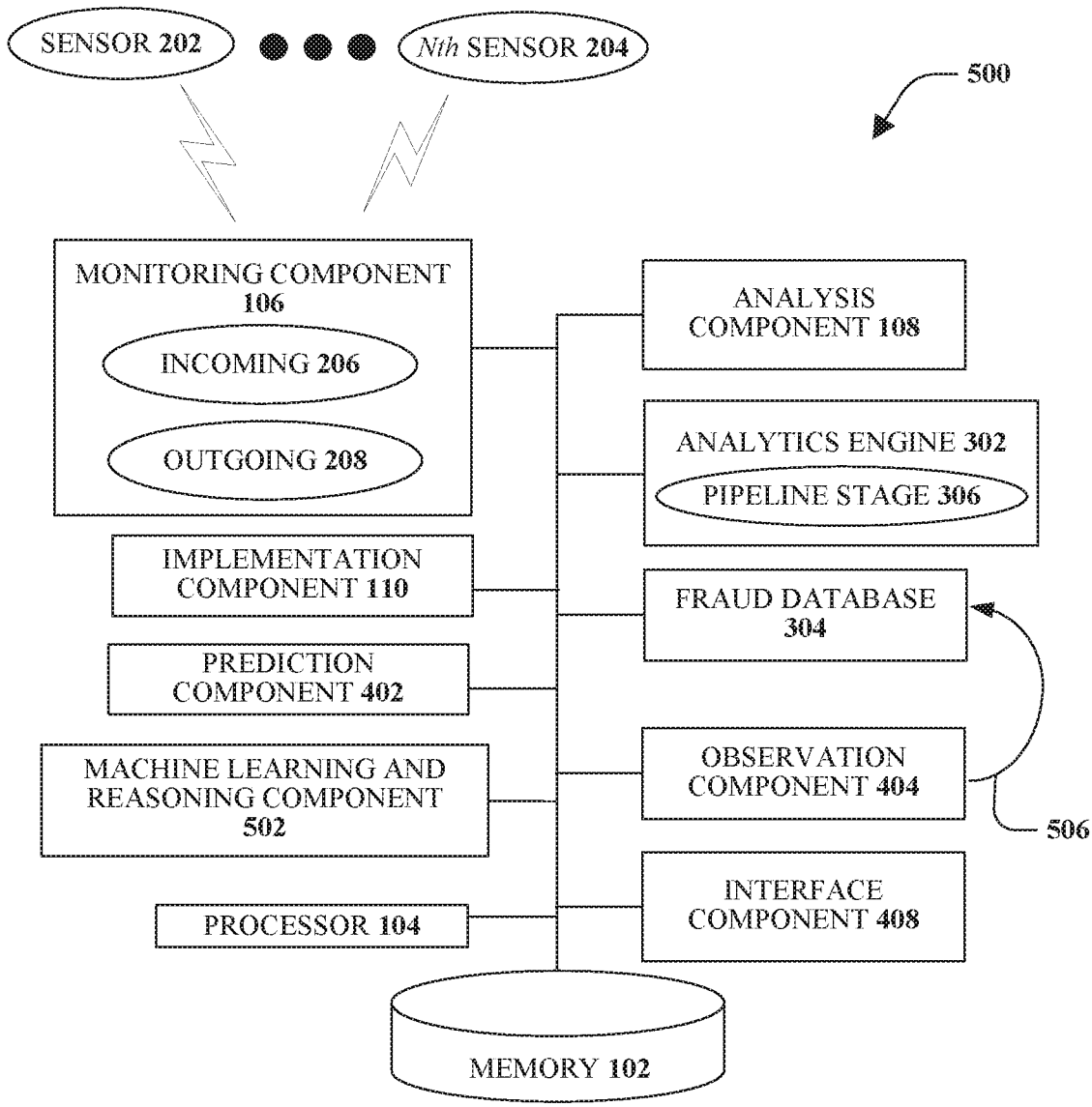
FIG. 5 illustrates an example, non-limiting system that employs automated learning to facilitate one or more of the disclosed aspects.

FIG. 5 illustrates an example, non-limiting system 500 that employs automated learning to facilitate one or more of the disclosed aspects. For example, a machine learning and reasoning component 502 may be utilized to automate one or more of the disclosed aspects. The machine learning and reasoning component 502 may be configured to scan for and determine, using fraud techniques, communications which that might be fraudulent or phishing attacks. Further, the machine learning and reasoning component 502 may utilize cognitive computing to determine whether one or more communications or interactions are legitimate or fraudulent.

According to some implementations, the machine learning and reasoning component 502 may be configured to facilitate computer vision (including image and video analytics and object recognition). In accordance with additional or alternative implementations, the machine learning and reasoning component 502 may be configured to facilitate computer audio (including speech and language analytics based on context).

The machine learning and reasoning component 502 may employ automated learning and reasoning procedures (e.g., the use of explicitly and/or implicitly trained statistical classifiers) in connection with performing inference and/or probabilistic determinations and/or statistical-based determinations in accordance with one or more aspects described herein.

For example, the machine learning and reasoning component 502 may employ principles of probabilistic and decision theoretic inference. Additionally or alternatively, the machine learning and reasoning component 502 may rely on predictive models constructed using machine learning and/or automated learning procedures. Logic-centric inference may also be employed separately or in conjunction with probabilistic methods.

The machine learning and reasoning component 502 may infer how a communication should be labeled (legitimate, fraudulent, suspicious, and so on), which communications or portions thereof should be flagged or marked with another indication, which communications should be routed to a third party, and so on. Based on this knowledge, the machine learning and reasoning component 502 may make an inference based on trigger events, policies, rules, and so on determined based on a description of the communication, historical information associated with at least portions of a communication, and so on.

As used herein, the term "inference" refers generally to the process of reasoning about or inferring states of the system, a component, a module, the environment, and/or customers (or devices associated with the customers) from a set of observations as captured through events, reports, data, and/or through other forms of communication. Inference may be employed to identify a specific context or action, or may generate a probability distribution over states, for example. The inference may be probabilistic. For example, computation of a probability distribution over states of interest based on a consideration of data and/or events. The inference may also refer to techniques employed for composing higher-level events from a set of events and/or data. Such inference may result in the construction of new events and/or actions from a set of observed events and/or stored event data, whether or not the events are correlated in close temporal proximity, and whether the events and/or data come from one or several events and/or data sources. Various classification schemes and/or systems (e.g., support vector machines, neural networks, logic-centric production systems, Bayesian belief networks, fuzzy logic, data fusion engines, and so on) may be employed in connection with performing automatic and/or inferred action in connection with the disclosed aspects.

The various aspects (e.g., in connection with facilitating a holistic fraud cocoon) may employ various artificial intelligence-based schemes for carrying out various aspects thereof. For example, a process for determining a status of a communication, whether the communication needs further scrutiny, whether the communication is allowed, whether the communication should be stopped, and so on may be enabled through an automatic classifier system and process.

A classifier is a function that maps an input attribute vector, x=(x1, x2, x3, x4, xn), to a confidence that the input belongs to a class. In other words, f(x)=confidence (class). Such classification may employ a probabilistic and/or statistical-based analysis (e.g., factoring into the analysis utilities and costs) to prognose or infer an action that should be employed to determine what communications should be held for further scrutiny, which transactions should be automatically alerted on, which communications should be automatically allowed, which communications should be automatically denied or stopped, and so on. In the case of a holistic fraud cocoon, for example, attributes may be keywords or phrases in a communication and the classes may be identification of a known fraud issue that matches a trigger event.

A support vector machine (SVM) is an example of a classifier that may be employed. The SVM operates by finding a hypersurface in the space of possible inputs, which hypersurface attempts to split the triggering criteria from the non-triggering events. Intuitively, this makes the classification correct for testing data that may be similar, but not necessarily identical to training data. Other directed and undirected model classification approaches (e.g., naïve Bayes, Bayesian networks, decision trees, neural networks, fuzzy logic models, and probabilistic classification models) providing different patterns of independence may be employed. Classification as used herein, may be inclusive of statistical regression that is utilized to develop models of priority.

One or more aspects may employ classifiers that are explicitly trained (e.g., through a generic training data) as well as classifiers that are implicitly trained (e.g., by observing user behavior, by receiving extrinsic information, and so on). For example, SVM's may be configured through a learning or training phase within a classifier constructor and feature selection module. Thus, a classifier(s) may be used to automatically learn and perform a number of functions, including but not limited to determining according to a predetermined criteria which communication may be resolved automatically based on historical data related to the same or a similar communication, which people should be contacted to help solve the identified communication, whether to open the communication response to additional people, whether the communication was resolved satisfactorily, and so forth. The criteria may include, but is not limited to, similar transactions, historical information, current information, event attributes, and so forth.

Additionally or alternatively, an implementation scheme (e.g., a rule, a policy, and so on) may be applied to control and/or regulate which communication submissions are considered to be routine and most likely are legitimate. In some implementations, based upon a predefined criterion, the rules-based implementation may automatically and/or dynamically interpret attributes associated with each communication. In response thereto, the rule-based implementation may automatically interpret and carry out functions associated with the communication by employing a predefined and/or programmed rule(s) based upon any desired criteria.

Methods that may be implemented in accordance with the disclosed subject matter, will be better appreciated with reference to the following flow charts. While, for purposes of simplicity of explanation, the methods are shown and described as a series of blocks, it is to be understood and appreciated that the disclosed aspects are not limited by the number or order of blocks, as some blocks may occur in different orders and/or at substantially the same time with other blocks from what is depicted and described herein. Moreover, not all illustrated blocks may be required to implement the disclosed methods. It is to be appreciated that the functionality associated with the blocks may be implemented by software, hardware, a combination thereof, or any other suitable means (e.g. device, system, process, component, and so forth). Additionally, it should be further appreciated that the disclosed methods are capable of being stored on an article of manufacture to facilitate transporting and transferring such methods to various devices. Those skilled in the art will understand and appreciate that the methods might alternatively be represented as a series of interrelated states or events, such as in a state diagram.

Figure 6:
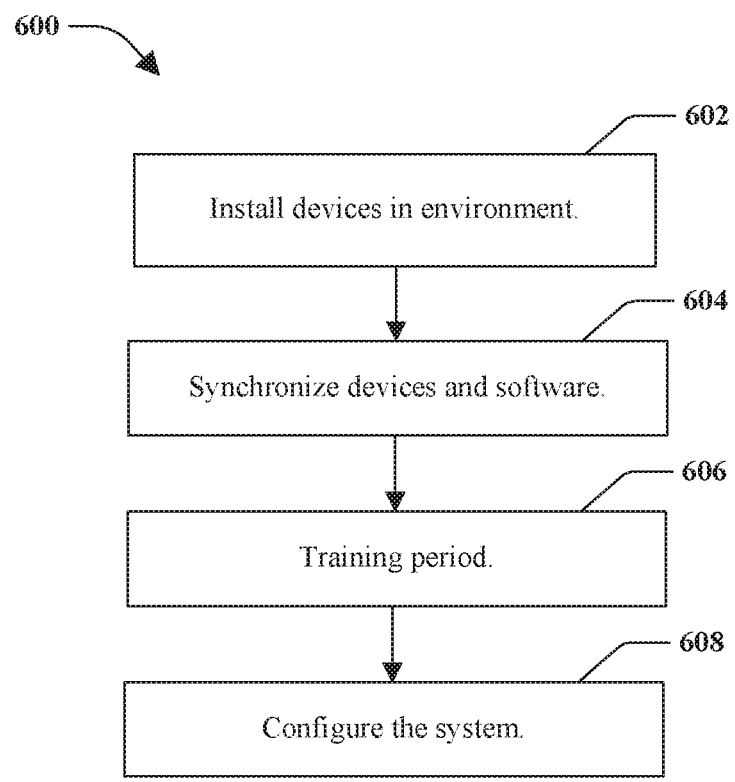
FIG. 6 illustrates an example, non-limiting method for setting up devices, systems, connectivity and the alerting/intervention preferences for a holistic fraud cocoon, according to an aspect.

FIG. 6 illustrates an example, non-limiting method 600 for setting up devices, systems, connectivity and the alerting/intervention preferences for a holistic fraud cocoon, according to an aspect. The method 600 in FIG. 6 may be implemented using, for example, any of the systems, such as the system 100 (of FIG. 1), described herein. It is noted that the method discusses a single embodiment generic flow based on any possible input and output tracking situation; however there are a multiplicity of flows depending on the specific devices used.

The method 600 starts, at 602, when devices are installed within the customer's environment. For example, the customer or someone else may place one or more devices in the customer's home. According to some implementations, software may be installed on the user's device in order to facilitate the capture of the communications.

At 604, the devices and software are synchronized to an analytics engine. The synchronization may include connecting the devices or software to the internet and to the analytics engine via the internet. This connection might be wireless, wired, Bluetooth, and so on.

At about the same time as the devices are in place, there may be a training period, at 606. The training period may be useful for the audio and video capture devices, in order for the devices to detect the customer's voice and image, in order to differentiate them from others in the area, and so on.

Optionally, at 608, the system is configured to capture and flag specific triggers which may be an issue for the customer. For example, if the customer is a hoarder or a compulsive shopper then the analytics engine is provided this information as a data point to use for filtering purposes These triggers may be created based on monitoring rules which will look out for specific outgoing communications by the customer which will trigger varying levels of actions. The actions may include but are not limited to: discarding the action, completing the action, completing a revised action after a human or machine review of the action and its impact, queueing the action for third party human review (e.g., offline scenario/response), activating the two way out-of-band interaction (e.g., real-time scenario/response), and so on.

Figure 7:
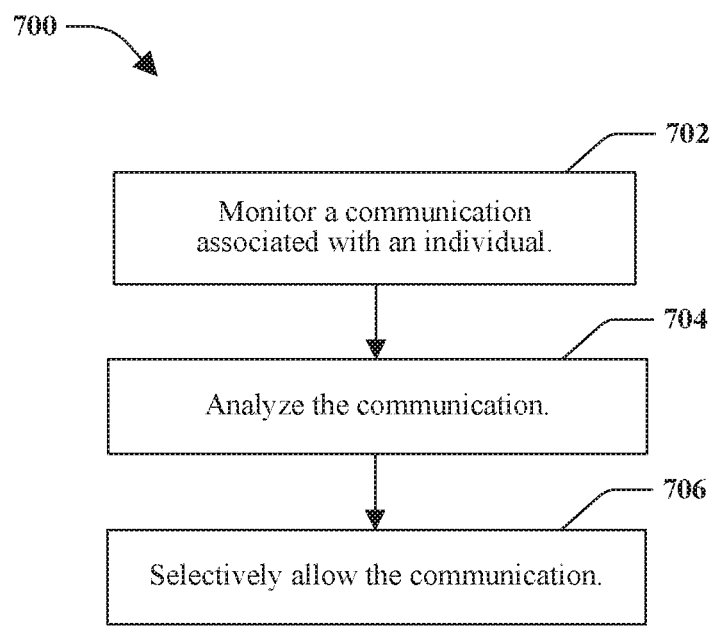
FIG. 7 illustrates an example, non-limiting method for a holistic fraud cocoon, according to an aspect.

FIG. 7 illustrates an example, non-limiting method 700 for a holistic fraud cocoon, according to an aspect. The method 700 in FIG. 7 may be implemented using, for example, any of the systems, such as the system 300 (of FIG. 3), described herein.

The method 700 starts at 702 when a communication associated with an identified individual is monitored. The communication may be any verbal or non-verbal communication. The communication may be between the individual and another person, or it may be between the individual and an object (e.g., a computer, a piece of paper, a television, and so on).

According to an example, monitoring the communication may include installing at least one sensor within an environment of the individual. In another example, monitoring the communication may include capturing an incoming communication, an outgoing communication, or combinations thereof.

At 704, the communication is analyzed. According to some implementations, the communication may be analyzed based on a filtering criteria predefined by the individual or a trusted third party. The analysis may indicate whether the communication is fraudulent or if no fraud is detected.

In an example, analyzing the communication may include identifying a trigger within the communication, the trigger is included in the filtering criteria. The trigger may be an action, a word, a phrase, or combinations thereof.

The communication is selectively allowed, at 706. Selectively allowing the communication may include allowing an action associated with the communication based on no fraud being detected. Alternatively, the communication is not allowed. According to this alternative aspect, the method includes denying the action associated with the communication based on the communication being fraudulent. In an example, selectively allowing the action comprises activating a two-way out-of-band interaction. In another example, selectively allowing the communication comprises discarding the communication prior to the individual receiving the communication.

In another example, selectively allowing the communication comprises completing a revised action based on evaluation of the revised actions and an impact associated with the revised action. Further to this example, completing the revised action comprises removing a portion of the communication prior to the communication being consumed by the individual. Alternatively or additionally, completing the revised action comprises including a signal with the communication, the signal alerts the individual to suspected fraud. In yet another example, completing the revised action may include diverting the communication from the individual to a trusted third-party.

According to some implementations, the method may continue to monitor the communication during a duration of the communication and taking another action based on fraud being indicated during the duration of the communication.

Figure 8:
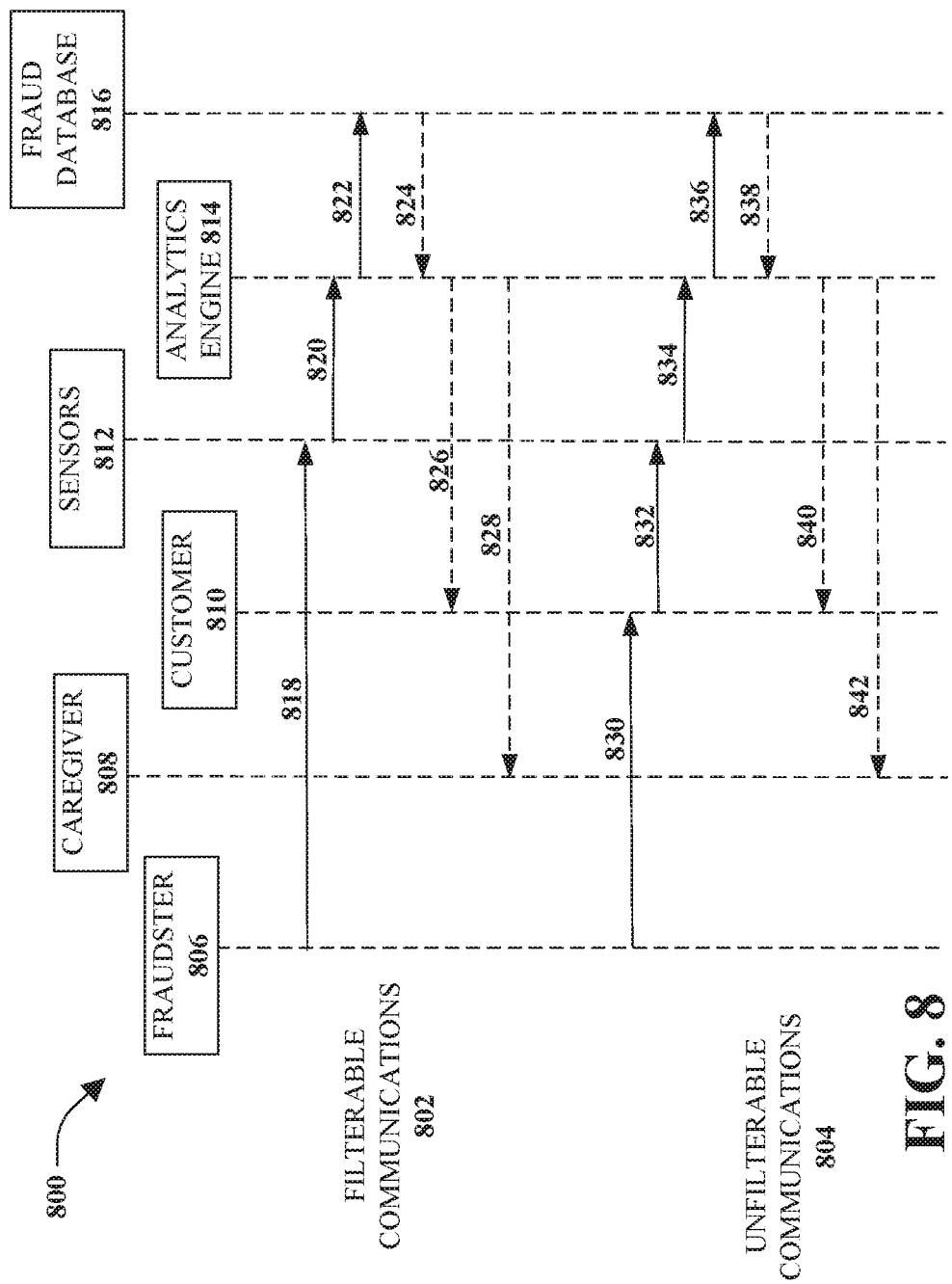
FIG. 8 illustrates an example, non-limiting flow chart for unfilterable communications and filterable communications, according to an aspect.

FIG. 8 illustrates an example, non-limiting flow chart 800 for unfilterable communications and filterable communications, according to an aspect. The flow chart 800 in FIG. 8 may be implemented using, for example, any of the systems, such as the system 400 (of FIG. 4), described herein.

Illustrated at the top of FIG. 8 is a flow chart for filterable communications 802; at the bottom of FIG. 8 is a flow chart for unfilterable communications 804. Horizontally across the top of FIG. 8 are illustrated a depiction of a fraudster 806, a caregiver 808, and a customer 810, all of which may be respective individuals or other users. Also illustrated are sensors 812, an analytics engine 814, and a fraud database 816.

In operation, there are different types of input available. A first type of input are those inputs that may be filtered before they are consumed by the customer (e.g., a smart television, a phone call, an email, in-person at door, and so on). A second type of input are those that may be scanned manually by the customer (e.g., paper mail, newspapers, and so on). Another type of input are those inputs that may not be filtered before consumption (e.g., television, radio, and so forth). A further type of input are those that are monitored as they are occurring (e.g., television, radio, in-person, phone conversation, and so on).

As it relates to filterable inputs, the input is captured before the customer is aware of it. According to an implementation, the communication is intercepted by sensors 812, as illustrated by arrow 818. For example, the feed to a smart television may be buffered and scanned before it is shown to the customer. The input is either initially filtered by the capturing device in order to reduce the amount of data to be transferred or transferred directly to the analytics engine 814. Arrow 820 represents the trigger to the analytics engine 814. The input is scanned by the analytics engine for common fraud red flags The analytics engine 814 compares the incoming communications to other communications in the fraud database (arrow 822), in order to indicate level of legitimacy. According to some implementations, the analytics engine 814 may, if necessary, convert the format of the communications to another format. For example, the analytics engine 814 may use speech-to-text to convert a voice mail to text in order to scan for flags.

If red flags are found, then depending on the configuration, the analytics engine 814 will instruct the device to perform one of the following non-inclusive actions.

According to an aspect, the entire communication may be removed, ideally without the customer even receiving the communication at all. In this case, the customer will not be aware of the communications. For example, an incoming phone call from an unknown number is redirected to voice mail. The salesperson leaves a voice mail. The voice mail is scanned, and is found to be from a known fraudster targeting seniors with a charity scam. The voice mail is deleted, and the phone number is flagged in the fraud database 816, and the customer never hears or sees the call come in on their phone.

In accordance with another aspect, parts of the communication may be removed, ideally revising the communication in such a way that the customer will not be able to detect the revision. For example, the voice mail may be passed through, but with relevant contact information missing.

According to another aspect, the communication may be passed through, with red flag warnings either attached to the communications in general, or to specific sections of the communications. In the example above, as the customer listens to the voicemail, an audio warning is read before and after the message in order to alert the customer to a possible fraudulent charity scam.

In an example of handing an incoming phone call, the call may be redirected. For example, there may be an in-phone assistant that screens the call before letting the call ring on the actual phone. In another example, the flow chart includes listening to the on-going phone conversation. This may detect a fraudulent call and triggers a real-time alert. Over another channel of communication that may be out-of-band. According to another example, the blocking and filtering may be performed before the communication reaches the customer 810.

According to the various implementations, after the fraud database is checked at 822, a response is received 824. Based on this response, the customer may be informed 826. Alternatively or additionally, the caregiver may be informed 828 of the incoming communication.

As mentioned above, another type of filterable communication are customer scanned inputs. In this case, the input needs to be scanned by the customer after the customer has become aware of the input. In these cases, it is up to the customer to perform the manual tasks required to capture an electronic version of the communications, and send it to the analytics engine 814 in order to perform the analysis. Since the customer is involved in the scanning, this may or may not occur as required.

The customer will take the communications and either run it through a scanning device, such as a flat-bed or feed scanner, or take a photo of the communications by using a smartphone or tablet computer. Software on the device will then send the captured image to the analytics engine 814 for processing The input is either initially filtered by the capturing device in order to reduce the amount of data to be transferred or transferred directly to the analytics engine 814. The input is scanned by the analytics engine 814 for common fraud red flags. The analytics engine 814 compares the incoming communications to other communications in the database, in order to indicate level of legitimacy The analytics engine 814 will then respond to the device or software with the action to take regarding this communications. The device/software may then alert the customer with any of the following non-inclusive notifications. Discard the document, preferably by shredding it. For example, if the document is a fraudulent request for money for a fake charity, the customer is instructed to destroy the document. Another notification may include to take action on the document, and describe the action to take. As an example, if the document is the customer's phone bill, then the action may be to pay the bill. In one embodiment, the customer may be able to tap on a "Pay Now" button on the scanning device or software. Another example notification may be to inform the customer of the nature of the document. For example, if it is a request from a legitimate charity (based on the analytics engine 814 confirming the legitimacy of the charity) then the device or software may inform the customer of this fact.

As it relates to unfilterable communication 804, these inputs are captured in real-time as the customer is consuming the communications. These may be radio, television, or in-person discussions. While the system will not be able to pre-process or filter the communications to the customer, it may however provide the customer with helpful guidance while the customer is consuming the communications The device or software captures the communications simultaneously along with the customer. For example, the communication is initiated 830 and the sensors listen 832. As the device or software captures the communications, it is either filtered somewhat by the device in order to reduce the data transferred to the analytics engine 814, or it is transferred directly to the analytics engine 814, illustrated by arrow 834.

As the analytics engine 814 receives the real-time input, it runs the captured communications against similar communications in the fraud database 816, as illustrated by arrow 836, to confirm if the communications are legitimate or not. It also flags any communications which may trigger undesirable actions by the customer. A response from the fraud database is received by the analytics engine 838.

If the communications are legitimate, or they do not trigger actions, then the device will continue to listen in. If the analytics engine 814, detects something amiss, it will then provide guidance to the customer in an appropriate way: For example, the customer may be informed 840 and/or the caregiver may be informed 842.

For television or radio input, the analytics engine 814 may audibly or visually suggest a course of action. For in-person input, the analytics engine 814 may text the customer's phone or tablet, or audibly ask to talk to the customer in another room. The analytics engine 814 will then detect that the customer has moved to another room (either via sensors in the detecting device or a combination of that plus a smartphone application executing on the customer's phone) and inform the customer of its findings.

For output monitoring, the holistic fraud cocoon will attempt to manage incoming communications appropriately in order to ensure that the customer is protected from fraudulent requests or communications which trigger undesirable actions, it is still possible that the customer may attempt to perform an undesirable action, either based on a trigger, or any reason at all. In those cases, the cocoon will also monitor outgoing communications for activities that the customer should not be undertaking. The monitoring rules may be set up during the setup phase, and may be continually updated as the customer's communications and state changes.

As the customer creates an outgoing communication the following actions may be performed. First, the communication is captured. Next, the communication is scanned in order to determine if the customer has attempted to initiate an action which may have undesirable consequences. Depending on the action, this may trigger one of the following non-inclusive events.

The action may be discarded. In this case, the action will not be performed. For example, the customer, who is a compulsive shopper, attempts to call an infomercial hotline in order to by an item which they should not be purchasing. The customer is not allowed to make the purchase.

In another example, the action is completed. Thus, in this case, the action will be performed as requested. For example, the customer wishes to make a small donation to their favorite charity, well within the limits set up in the setup phase.

Another example relates to completing the revised action. In this situation, the action will be performed; however the parameters of the action will be revised in order to meet the rules set forth in the setup phase. For example, assume that the customer has attempted to make a donation to the same charity, however it is well above their normal contribution and will strongly negatively impact the customer's financial health. In this case, the amount of the contribution may be reduced by the cocoon and be allowed to progress. This may or may not require human intervention.

In another example, the communication may be queued for third party review. This will place the action on hold until a third party may review or approve the action. The communications back to the customer may be varied. In this embodiment, the actions requested by the customer are placed into a queue for a reviewer to look at prior to execution. The reviewer may be notified by a text message or application notification. They will then log into the web interface of the analytics engine via a desktop computer, mobile device, or other communications device. The third parties may then review and approve or deny actions requested by the customer. Approved actions are then triggered to complete, and denied actions are deleted.

Figure 9:
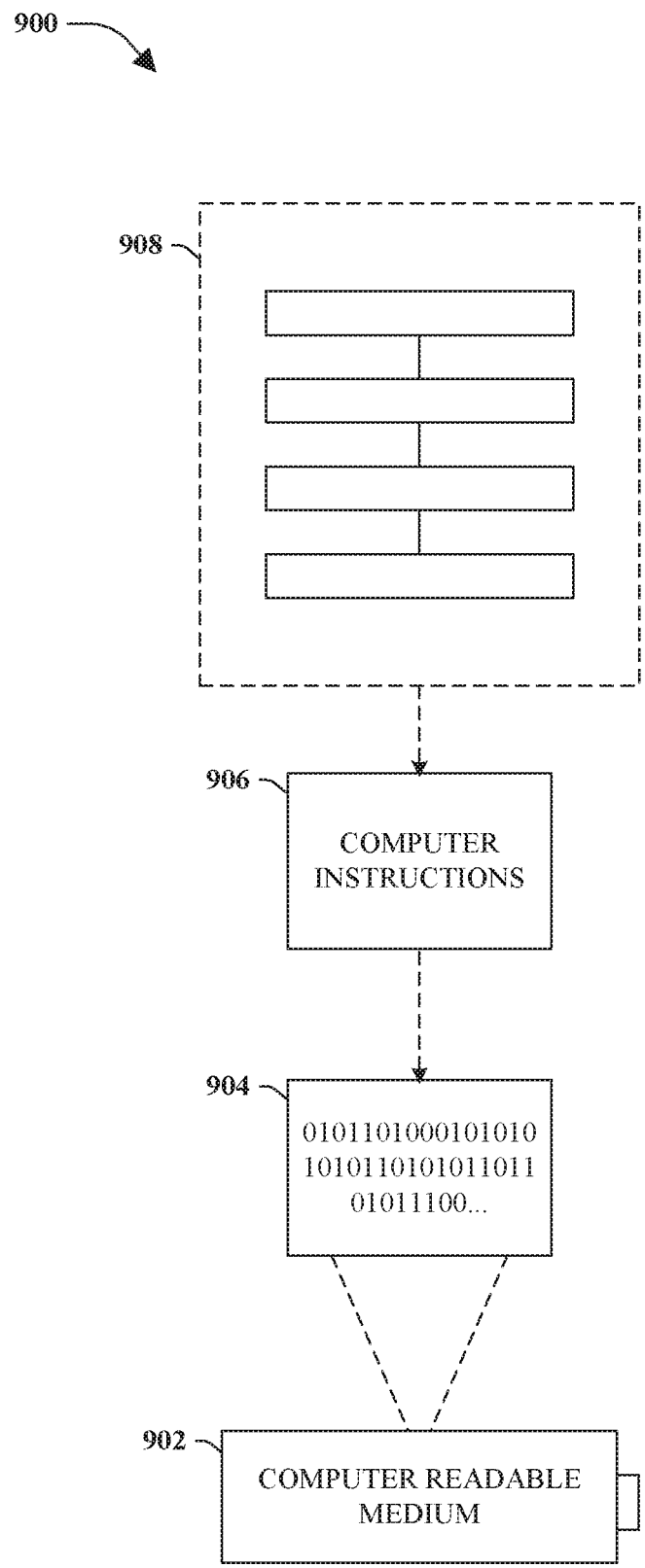
FIG. 9 illustrates an example, non-limiting computer-readable medium or computer-readable device including processor-executable instructions configured to embody one or more of the aspects set forth herein.

One or more implementations include a computer-readable medium including microprocessor or processor-executable instructions configured to implement one or more embodiments presented herein. As discussed herein the various aspects enable a holistic fraud cocoon. An embodiment of a computer-readable medium or a computer-readable device devised in these ways is illustrated in FIG. 9, wherein an implementation 900 includes a computer-readable medium 902, such as a CD-R, DVD-R, flash drive, a platter of a hard disk drive, and so forth, on which is encoded computer-readable data 904. The computer-readable data 904, such as binary data including a plurality of zero's and one's as illustrated, in turn includes a set of computer instructions 906 configured to operate according to one or more of the principles set forth herein.

In the illustrated embodiment 900, the set of computer instructions 906 (e.g., processor-executable computer instructions) may be configured to perform a method 908, such as the method 600 of FIG. 6 and/or the method 800 of FIG. 8, for example. In another embodiment, the set of computer instructions 906 may be configured to implement a system, such as the system 200 of FIG. 2 and/or the system 500 of FIG. 5, for example. Many such computer-readable media may be devised by those of ordinary skill in the art that are configured to operate in accordance with the techniques presented herein.

As used in this application, the terms "component," "module," "system," "interface," "manager," and the like are generally intended to refer to a computer-related entity, either hardware, a combination of hardware and software, software, or software in execution. For example, a component may be, but is not limited to being, a process running on a processor, a processor, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter may be implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

FIG. 9 and the following discussion provide a description of a suitable computing environment to implement embodiments of one or more of the aspects set forth herein. The operating environment of FIG. 9 is merely one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, and the like, multiprocessor systems, consumer electronics, mini computers, mainframe computers, distributed computing environments that include any of the above systems or devices, etc.

Generally, embodiments are described in the general context of "computer readable instructions" being executed by one or more computing devices. Computer readable instructions may be distributed via computer readable media as will be discussed below. Computer readable instructions may be implemented as program modules, such as functions, objects, Application Programming Interfaces (APIs), data structures, and the like, that perform one or more tasks or implement one or more abstract data types. Typically, the functionality of the computer readable instructions are combined or distributed as desired in various environments.

Figure 10:
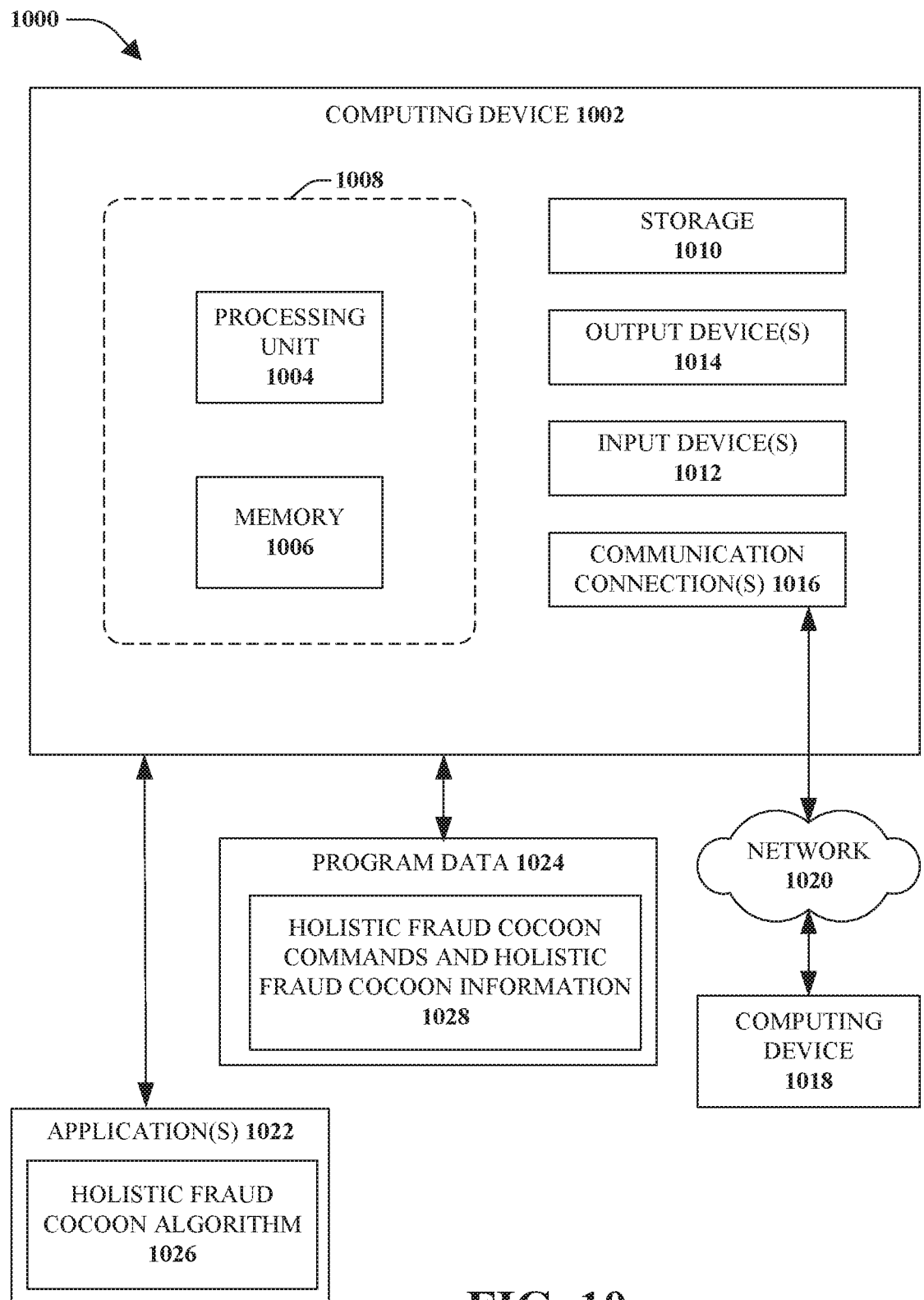
FIG. 10 illustrates an example, non-limiting computing environment where one or more of the aspects set forth herein are implemented, according to one or more aspects.

FIG. 10 illustrates a system 1000 that may include a computing device 1002 configured to implement one or more embodiments provided herein. In one configuration, the computing device 1002 may include at least one processing unit 1004 and at least one memory 1006. Depending on the exact configuration and type of computing device, the at least one memory 1006 may be volatile, such as RAM, non-volatile, such as ROM, flash memory, etc., or a combination thereof. This configuration is illustrated in FIG. 10 by dashed line 1008.

In other embodiments, the computing device 1002 may include additional features or functionality. For example, the computing device 1002 may include additional storage such as removable storage or non-removable storage, including, but not limited to, magnetic storage, optical storage, etc. Such additional storage is illustrated in FIG. 10 by storage 1010. In one or more embodiments, computer readable instructions to implement one or more embodiments provided herein are in the storage 1010. The storage 1010 may store other computer readable instructions to implement an operating system, an application program, etc. Computer readable instructions may be loaded in the at least one memory 1006 for execution by the at least one processing unit 1004, for example.

Computing devices may include a variety of media, which may include computer-readable storage media or communications media, which two terms are used herein differently from one another as indicated below.

Computer-readable storage media may be any available storage media, which may be accessed by the computer and includes both volatile and nonvolatile media, removable and non-removable media. By way of example, and not limitation, computer-readable storage media may be implemented in connection with any method or technology for storage of information such as computer-readable instructions, program modules, structured data, or unstructured data. Computer-readable storage media may include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which may be used to store desired information. Computer-readable storage media may be accessed by one or more local or remote computing devices (e.g., via access requests, queries or other data retrieval protocols) for a variety of operations with respect to the information stored by the medium.

Communications media typically embody computer-readable instructions, data structures, program modules, or other structured or unstructured data in a data signal such as a modulated data signal (e.g., a carrier wave or other transport mechanism) and includes any information delivery or transport media. The term "modulated data signal" (or signals) refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

The computing device 1002 may include input device(s) 1012 such as keyboard, mouse, pen, voice input device, touch input device, infrared cameras, video input devices, or any other input device. Output device(s) 1014 such as one or more displays, speakers, printers, or any other output device may be included with the computing device 1002. The input device(s) 1012 and the output device(s) 1014 may be connected to the computing device 1002 via a wired connection, wireless connection, or any combination thereof. In one or more embodiments, an input device or an output device from another computing device may be used as the input device(s) 1012 and/or the output device(s) 1014 for the computing device 1002. Further, the computing device 1002 may include communication connection(s) 1016 to facilitate communications with one or more other devices, illustrated as a computing device 1018 coupled over a network 1020.

One or more applications 1022 and/or program data 1024 may be accessible by the computing device 1002. According to some implementations, the application(s) 1022 and/or program data 1024 are included, at least in part, in the computing device 1002. The application(s) 1022 may include a holistic fraud cocoon algorithm 1026 that is arranged to perform the functions as described herein including those described with respect to the system 300 of FIG. 3. The program data 1024 may include holistic fraud cocoon commands and holistic fraud cocoon information 1028 that may be useful for operation with the various aspects as described herein.

Although the subject matter has been described in language specific to structural features or methodological acts, it is to be understood that the subject matter of the appended claims is not necessarily limited to the specific features or acts described above. Rather, the specific features and acts described above are disclosed as example embodiments.

Various operations of embodiments are provided herein. The order in which one or more or all of the operations are described should not be construed as to imply that these operations are necessarily order dependent. Alternative ordering will be appreciated based on this description. Further, not all operations may necessarily be present in each embodiment provided herein.

As used in this application, "or" is intended to mean an inclusive "or" rather than an exclusive "or." Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has," "with," or variants thereof are used in either the detailed description or the claims, such terms are intended to be inclusive in a manner similar to the term "comprising".

As used herein an "entity" or "financial entity" refers to a financial institution, such as a bank, persons operating on behalf of the financial institution, and/or communication devices managed by the financial institution and/or the persons operating on behalf of the financial institution. Additionally or alternatively, the entity may be a third party monitoring source or another type of entity that has a trusted relationship with the financial institution.

Further, unless specified otherwise, "first," "second," or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising," "comprises," "including," "includes," or the like generally means comprising or including.

Although the disclosure has been shown and described with respect to one or more implementations, equivalent alterations and modifications will occur based on a reading and understanding of this specification and the annexed drawings. The disclosure includes all such modifications and alterations and is limited only by the scope of the following claims.

What is claimed is:
1. A method, comprising:
  monitoring, by a system comprising a processor, an environment associated with an identified individual by using a set of sensors installed within the environment;
  capturing, based on the set of sensors monitoring the environment, filterable communication data associated with the identified individual, wherein the filterable communication data includes a first communication that includes audio data corresponding to at least part of a verbal communication being transmitted by a first another entity, and wherein:
    an audio sensor of the set of sensors captures the audio data of the first communication in response to detecting a trigger event, the trigger event including a detection of key words or phrases, voice inflection, and voice stress during the verbal communication;
  processing, by the system, the filterable communication data using a machine-learning model to generate a first classification label indicating an extent to which the filterable communication data corresponds to a predicted fraudulent activity;
  before the identified individual accesses the filterable communication data, performing, by the system, a first corrective action determining that the first classification label of the filterable communication data indicates the predicted fraudulent activity, where the first corrective action includes discarding the filterable communication data to prevent the identified individual from receiving the filterable communication data;

accessing, by the system, a first feedback for the first corrective action;

adjusting, by the system, one or more parameters of the machine-learning model based on the first feedback;

capturing, based on the set of sensors monitoring the environment, unfilterable communication data associated with the identified individual, wherein the unfilterable communication data includes a second communication that includes text data of a physical document generated by a second entity, wherein the unfilterable communication data indicates that the identified individual has accessed the second communication, and wherein:

a video sensor of the set of sensors captures the text data of the second communication in response to an interactive chatbot prompting the identified individual to hold one or more pages of the physical document in front of the video sensor;

processing, by the system, the unfilterable communication data using the machine-learning model to generate a second classification label indicating an extent to which the unfilterable communication data corresponds to another predicted fraudulent activity;

performing, by the system, second corrective actions based on determining that the second classification label of the unfilterable communication data indicates the other predicted fraudulent activity, wherein the second corrective action include: (i) intercepting and discarding one or more outgoing communications transmitted by the identified individual to prevent the second entity from accessing the one or more outgoing communications; and (ii) sending an alert to the identified individual to discard the physical document;

identifying, by the system, a second feedback of the second corrective action; and further adjusting, by the system, the one or more parameters of the machine-learning model based on the second feedback.

2. The method of claim 1, wherein performing the second corrective actions further comprises:

continuing to monitor the environment during a duration of the second communication; and performing a third corrective action based on the predicted fraud activity being determined during the duration of the second communication, wherein the third corrective action includes transmitting a prompt to a trusted third-party associated with the identified individual.

3. The method of claim 1, wherein the capturing of the filterable or unfilterable communication data further comprises capturing an incoming communication data, an outgoing communication data, or combinations thereof.

4. The method of claim 1, wherein the capturing of the filterable communication data further comprises the video sensor of the set of sensors capturing video data in response to detecting a second trigger event, wherein the second trigger event includes a detection of an action of the identified individual, a movement pattern of the identified individual, or combinations thereof.

5. A non-transitory computer-readable storage device that stores executable instructions that, in response to execution, cause a system comprising a processor to perform operations, comprising:

monitoring an environment associated with an identified individual by using a set of sensors installed within the environment;

capturing, based on the set of sensors monitoring the environment, filterable communication data associated with the identified individual, wherein the filterable communication data includes a first communication that includes audio data corresponding to at least part of a verbal communication being transmitted by a first entity, wherein the filterable communication data indicates that the identified individual is yet to access the first communication from the first entity, and wherein:

an audio sensor of the set of sensors captures the audio data of the first communication in response to detecting a trigger event, the trigger event including a detection of key words or phrases, voice inflection, and voice stress during the verbal communication;

processing the filterable communication data using a machine-learning model to generate a first classification label indicating an extent to which the filterable communication data corresponds to a predicted fraudulent activity;

before the identified individual accesses the filterable communication data, performing a first corrective action based on determining that the first classification label of the filterable communication data indicates the predicted fraudulent activity, wherein the first corrective action includes discarding the filterable communication data to prevent the identified individual from receiving the filterable communication data;

accessing a first feedback for the first corrective action;

adjusting one or more parameters of the machine-learning model based on the first feedback;

capturing, based on the set of sensors monitoring the environment, unfilterable communication data associated with the identified individual, wherein the unfilterable communication data includes a second communication that includes text data of a physical document generated by a second entity, wherein the unfilterable communication data indicates that the identified individual has accessed the second communication, and wherein:

a video sensor of the set of sensors captures the text data of the second communication in response to an interactive chatbot prompting the identified individual to hold one or more pages of the physical document in front of the video sensor;

processing the unfilterable communication data using the machine-learning model to generate a second classification label indicating an extent to which the unfilterable communication data corresponds another predicted fraudulent activity;

performing second corrective actions based on determining that the second classification label of the unfilterable communication data indicates the other predicted fraudulent activity, wherein the second corrective actions include: (i) intercepting and discarding one or more outgoing communications transmitted by the identified individual to prevent the second entity from accessing the one or more outgoing communications; and (ii) sending an alert to the identified individual to discard the physical document;

identifying a second feedback of the second corrective action; and further adjusting the one or more parameters of the machine-learning model based on the second feedback.

6. The non-transitory computer-readable storage device of claim 5, wherein performing the first corrective action comprises diverting the first communication such that the first communication is transmitted to a trusted third-party.

7. A system, comprising:
a processor; and
a memory that stores executable instructions that, when executed by the processor, facilitate performance of operations, comprising:
  monitoring an environment associated with an identified individual by using a set of sensors installed within the environment;
  capturing, based on the set of sensors monitoring the environment, filterable communication data associated with the identified individual, wherein the filterable communication data includes a first communication that includes audio data corresponding to at least part of a verbal communication being transmitted by a first entity, wherein the filterable communication data indicates that the identified individual is yet to access the first communication from the first entity, and wherein:
    an audio sensor of the set of sensors captures the audio data of the first communication in response to detecting a trigger event, the trigger event including a detection of key words or phrases, voice inflection, and voice stress during the verbal communication;
  processing the filterable communication data using a machine-learning model to generate a first classification label indicating an extent to which the filterable communication data corresponds to a predicted fraudulent activity;
  before the identified individual accesses the filterable communication data, performing a first corrective action based on determining that the first classification label of the filterable communication data indicates the predicted fraudulent activity, wherein the first corrective action includes discarding the filterable communication data to prevent the identified individual from receiving the filterable communication data;
  accessing a first feedback for the first corrective action;
  adjusting one or more parameters of the machine-learning model based on the first feedback;
  capturing, based on the set of sensors monitoring the environment, unfilterable communication data associated with the identified individual, wherein the unfilterable communication data includes a second communication that includes text data of a physical document generated by a second entity, wherein the unfilterable communication data indicates that the identified individual has accessed the second communication, and wherein:
    a video sensor of the set of sensors captures the text data of the second communication in response to an interactive chatbot prompting the identified individual to hold one or more pages of the physical document in front of the video sensor;
  processing the unfilterable communication data using the machine-learning model to generate a second classification label indicating an extent to which the unfilterable communication data corresponds another predicted fraudulent activity;
  performing second corrective actions based on determining that the second classification label of the unfilterable communication data indicates the other predicted fraudulent activity, wherein the second corrective actions include: (i) intercepting and discarding one or more outgoing communications transmitted by the identified individual to prevent the second entity from accessing the one or more outgoing communications; and (ii) sending an alert to the identified individual to discard the physical document;
  identifying a second feedback of the second corrective action; and
  further adjusting the one or more parameters of the machine-learning model based on the second feedback.

8. The system of claim 7, wherein the set of sensors includes at least standalone Bluetooth speakers.

9. The system of claim 7, wherein capturing the filterable or unfilterable communication data comprises capturing an incoming communication data, an outgoing communication data, or combinations thereof.

10. The system of claim 7, wherein analyzing the filterable communication data comprises the video sensor of the set of sensors capturing video data in response to detecting a second trigger event.

11. The system of claim 10, wherein the second trigger event includes a detection of an action of the identified individual, a movement pattern of the identified individual, or combinations thereof.

12. The system of claim 7, wherein performing the first corrective action further comprises removing a portion of the first communication prior to the first communication being consumed by the identified individual.

13. The system of claim 7, wherein performing the first corrective action further comprises including a signal in the first communication, wherein the signal alerts the identified individual of the predicted fraudulent activity.

14. The system of claim 7, wherein performing the first corrective action further comprises diverting the first communication such that the first communication is transmitted to a trusted third-party.

15. The system of claim 7, wherein the first or second corrective actions further comprise the interactive chatbot transmitting one or more messages via a two-way out-of-band interaction.

16. The system of claim 7, wherein performing the second corrective actions further comprises:
  continuing to monitor the environment during a duration of the second communication; and
  performing a third corrective action based on the predicted fraud activity being determined during the duration of the second communication, wherein the third corrective action includes transmitting a prompt to a trusted third-party associated with the identified individual.

17. The system of claim 7, wherein the audio sensor includes a software component that monitors a Voice Over Internet Protocol (VOIP) connection to capture the first communication.

18. The system of claim 7, wherein the machine-learning model is a support vector machine.

* * * * *